US012583487B2

(12) United States Patent
Hong et al.

(10) Patent No.: US 12,583,487 B2
(45) Date of Patent: Mar. 24, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventors: Jeong Ki Hong, Seongnam-Si (KR); Kyung Joo Bang, Hwaseong-Si (KR); Jae Woong Hwang, Seoul (KR); Dong Hyuk Kim, Hanam-si (KR); Il Hwan Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 172 days.

(21) Appl. No.: 18/533,333

(22) Filed: Dec. 8, 2023

(65) Prior Publication Data
US 2025/0010890 A1 Jan. 9, 2025

(30) Foreign Application Priority Data
Jul. 6, 2023 (KR) ........................ 10-2023-0087868

(51) Int. Cl.
*B60W 60/00* (2020.01)
*B60W 30/16* (2020.01)
(Continued)

(52) U.S. Cl.
CPC ........ *B60W 60/0059* (2020.02); *B60W 30/16* (2013.01); *B60W 30/18009* (2013.01);
(Continued)

(58) Field of Classification Search
None
See application file for complete search history.

(56) References Cited

U.S. PATENT DOCUMENTS

2013/0085631 A1* 4/2013 Kim ........................ B60L 58/13
701/22
2018/0203455 A1* 7/2018 Cronin ................. G05D 1/0217
(Continued)

FOREIGN PATENT DOCUMENTS

EP        2570651 A2 * 3/2013 .......... F02N 11/0837
JP    2017077765 A * 4/2017

OTHER PUBLICATIONS

Espacenet English Translation of JP-2017077765-A (Year: 2017).*

*Primary Examiner* — James J Lee
*Assistant Examiner* — Andrew Sang Kim
(74) *Attorney, Agent, or Firm* — Banner & Witcoff, Ltd.

(57) ABSTRACT

Disclosed is an autonomous driving control apparatus. The autonomous driving control apparatus includes a sensor device, a driving device, a memory, and a control device. For example, the autonomous driving control apparatus identifies host vehicle information including at least one of a real-time weight of a host vehicle, gear information of the host vehicle, a driving speed of the host vehicle, or a combination of the real-time weight, the gear information, and the driving speed by using the sensor device, identifies required driving torque required to drive on a hill placed on a driving route of the host vehicle through the driving device by using the host vehicle information, and provides a user with route change information, or provides a transition request for control authority for the host vehicle if output available torque of the host vehicle is less than the required driving torque.

20 Claims, 8 Drawing Sheets

(51) Int. Cl.

| | |
|---|---|
| *B60W 30/18* | (2012.01) |
| *B60W 50/10* | (2012.01) |
| *B60W 50/14* | (2020.01) |
| *G01C 21/34* | (2006.01) |

(52) U.S. Cl.
    CPC ............ *B60W 50/10* (2013.01); *B60W 50/14*
       (2013.01); *B60W 60/001* (2020.02); *B60W*
       *60/0053* (2020.02); *G01C 21/3461* (2013.01);
       *B60W 2510/1005* (2013.01); *B60W 2520/10*
       (2013.01); *B60W 2530/10* (2013.01); *B60W*
       *2554/802* (2020.02); *B60W 2556/50* (2020.02)

(56)                 References Cited

U.S. PATENT DOCUMENTS

| | | | |
|---|---|---|---|
| 2021/0180968 A1* | 6/2021 | Jang ................... | G01C 21/3469 |
| 2022/0281457 A1* | 9/2022 | Usui ................ | B60W 40/1005 |

\* cited by examiner

AUTONOMOUS DRIVING
CONTROL APPARATUS
100

SENSOR DEVICE
110

DRIVING DEVICE
120

MEMORY
130

CONTROL DEVICE
140

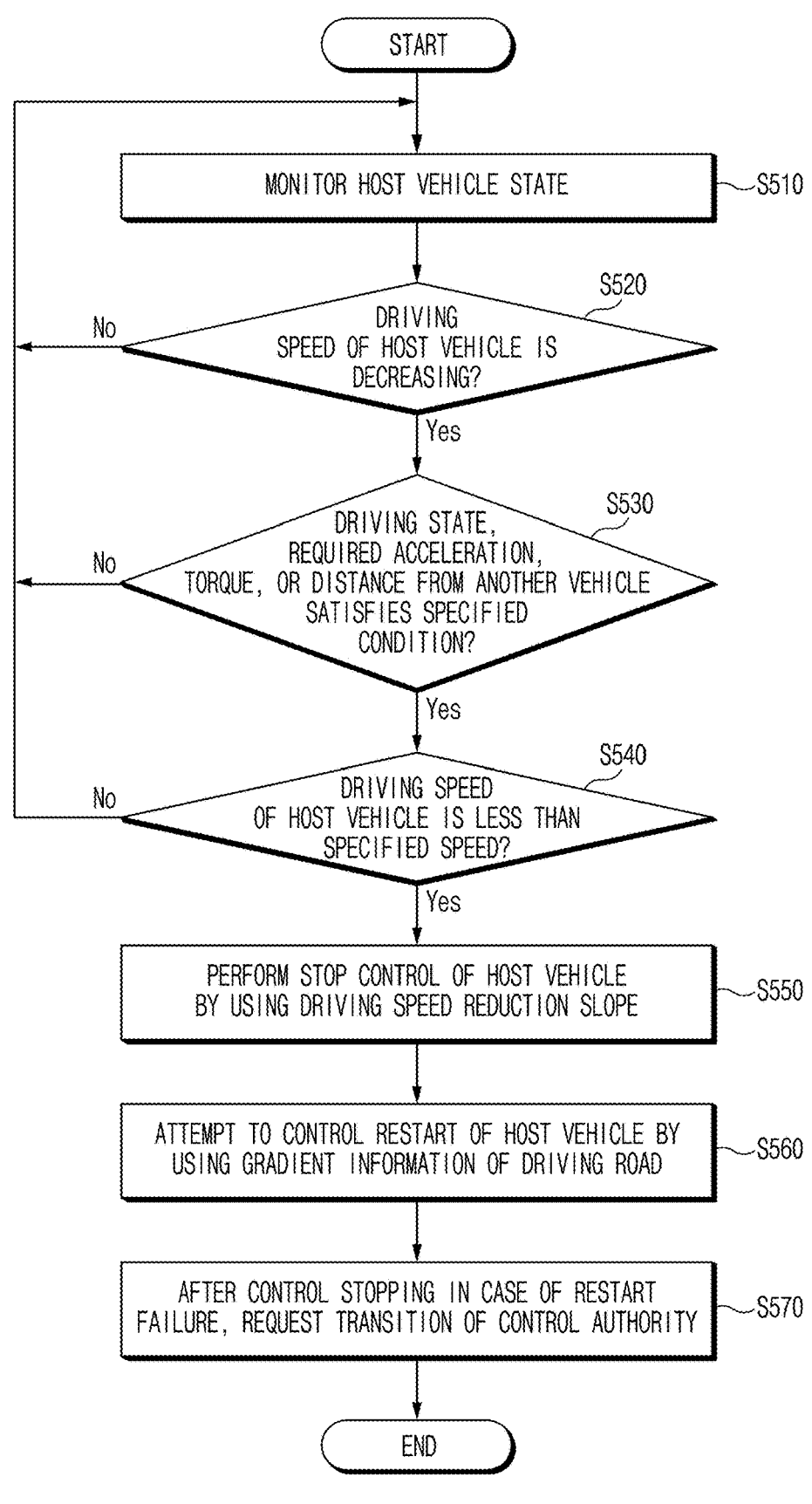

START

MONITOR HOST VEHICLE STATE ~S510

DRIVING
SPEED OF HOST VEHICLE IS
DECREASING? ~S520
No — Yes

DRIVING STATE,
REQUIRED ACCELERATION,
TORQUE, OR DISTANCE FROM ANOTHER VEHICLE
SATISFIES SPECIFIED
CONDITION? ~S530
No — Yes

DRIVING SPEED
OF HOST VEHICLE IS LESS THAN
SPECIFIED SPEED? ~S540
No — Yes

PERFORM STOP CONTROL OF HOST VEHICLE
BY USING DRIVING SPEED REDUCTION SLOPE ~S550

ATTEMPT TO CONTROL RESTART OF HOST VEHICLE BY
USING GRADIENT INFORMATION OF DRIVING ROAD ~S560

AFTER CONTROL STOPPING IN CASE OF RESTART
FAILURE, REQUEST TRANSITION OF CONTROL AUTHORITY ~S570

END

FIG.5

APPARATUS FOR CONTROLLING AUTONOMOUS DRIVING AND METHOD THEREOF

CROSS-REFERENCE TO RELATED APPLICATION

This application claims the benefit of priority to Korean Patent Application No. 10-2023-0087868, filed in the Korean Intellectual Property Office on Jul. 6, 2023, the entire contents of which are incorporated herein by reference.

TECHNICAL FIELD

The present disclosure relates to an autonomous driving control apparatus and a method thereof, and more particularly, relates to a technology for controlling autonomous driving of a host vehicle in a section including an uphill road such as a hill.

BACKGROUND

Various technologies related to autonomous driving have been introduced. The autonomous driving may be classified into partial autonomous driving, conditional autonomous driving, highly autonomous driving, and/or fully autonomous driving depending on a control level.

If a driving route includes an uphill road having a relatively high gradient (e.g., a hill), there may be restrictions on driving a host vehicle by autonomous driving control. For example, in one case among a case that the weight of the host vehicle is high, a case that a gradient is greater than or equal to a specific value, or any combination thereof, a roll-back phenomenon of a host vehicle may occur.

An autonomous driving control apparatus may stop a host vehicle in a situation where driving control of the host vehicle is difficult. For example, when the host vehicle is driving on a hill having a gradient greater than or equal to a specified level, the host vehicle may be stopped.

However, the autonomous driving control apparatus may generate braking force for braking of the host vehicle based on a uniform criterion, and thus unnecessary impact may be applied to objects loaded onto the host vehicle and/or users riding in the host vehicle.

Moreover, the autonomous driving control apparatus may provide only a passive solution, for example, monitoring a gradient of a section, in which a host vehicle is driving in real time, by using an acceleration sensor or the like and restricting or releasing a range of an autonomous driving control function when it is identified that the corresponding section has a gradient greater than or equal to a specific value.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides a function of identifying a hill having a gradient greater than or equal to a specific value placed on a driving route of a host vehicle based on various criteria and grounds and avoiding the corresponding driving route in advance.

An aspect of the present disclosure provides a function of recommending a different route or performing alternative driving control depending on situations immediately before the host vehicle enters a hill and after the host vehicle enters the hill when it is expected that the host vehicle enters the hill having a gradient greater than or equal to a specific value.

An aspect of the present disclosure provides a function of receiving information about a driving route of the host vehicle and providing the user with notification information about the situation when it is predicted in advance that there will be restrictions on driving of the host vehicle based on the received information.

An aspect of the present disclosure provides a function of providing the user with notification information based on at least part of sensing information obtained by using a sensor immediately before the host vehicle enters the hill, and stopping the host vehicle depending on situations.

An aspect of the present disclosure provides a function of adaptively setting the magnitude of braking force or the magnitude of torque for restart by using at least one of a speed change rate of the host vehicle, hill information, or any combination thereof when the host vehicle enters a hill.

The technical problems to be solved by the present disclosure are not limited to the aforementioned problems, and any other technical problems not mentioned herein will be clearly understood from the following description by those skilled in the art to which the present disclosure pertains.

An apparatus may comprise: a sensor device; a driving device; a memory configured to store instructions; and a control device operatively coupled to the sensor device, the driving device, and the memory, wherein the instructions, when executed by the control device, cause the apparatus to: identify, by using the sensor device, host vehicle information, wherein the host vehicle information comprises at least one of: a real-time weight of a host vehicle, gear information of the host vehicle, or a driving speed of the host vehicle; identify, by using the host vehicle information, required driving torque that is required to drive, using the driving device, the host vehicle on a hill on a driving route of the host vehicle; and output, based on output available torque of the host vehicle being less than the required driving torque, at least one of: route change information or a transition request for transitioning a control authority for the host vehicle.

The apparatus may further comprise: a communication device, wherein the instructions, when executed by the control device, cause the apparatus to: receive, via the communication device, map information about the driving route, wherein the map information comprises at least one of: an advanced driver assistance system (ADAS) map, a precision map, a navigation map, or real-time traffic information; and identify, based on the map information, the required driving torque.

The instructions, when executed by the control device, may cause the apparatus to: identify, based on the map information and based on the host vehicle reaching a section on the driving route, section information of the section and an expected driving speed, wherein the section has a gradient greater than or equal to a specified value; and identify, based on the section information and the expected driving speed, the required driving torque.

The instructions, when executed by the control device, may cause the apparatus to: identify, based on the map information and based on the output available torque being less than the required driving torque, a different driving route for providing a guide to bypass the hill; output the route change information, wherein the route change information indicates the different driving route; and control, based on a route change response being received from a user, the host vehicle to drive along the different driving route.

The instructions, when executed by the control device, may cause the apparatus to: before the host vehicle reaches the hill, identify, by using the sensor device, sensing information comprising at least one of: gradient information of the hill, road surface information of the hill, an expected driving speed of the host vehicle on the hill, an operating history of the driving device, or a performance value of the driving device; and identify, based on the sensing information, the required driving torque.

The instructions, when executed by the control device, may cause the apparatus to: output, based on the output available torque being less than the required driving torque, the transition request for transitioning the control authority for the host vehicle; and based on a control authority transition acceptance response received from a user of the host vehicle, deactivate an autonomous driving control of the host vehicle and transfer the control authority to the user.

The instructions, when executed by the control device, may cause the apparatus to: based on a failure of receiving a control authority transition acceptance response from a user of the host vehicle, stop the host vehicle before the host vehicle reaches the hill and output a notification regarding the hill.

The instructions, when executed by the control device, may cause the apparatus to: identify, based on a determination that the host vehicle reaches the hill, driving information comprising at least one of: the driving speed of the host vehicle, a driving speed change rate of the host vehicle, a required acceleration, the required driving torque, or a gradient of the hill; and based on the gradient of the hill and based on the driving information satisfying a specified condition, stop the host vehicle and restart the host vehicle.

The instructions, when executed by the control device, may cause the apparatus to: based on the driving information satisfying the specified condition: set a deceleration control amount of the host vehicle in proportion to an absolute value of the driving speed change rate and stop the host vehicle by using the set deceleration control amount; and after stopping the host vehicle, set a torque slope for restarting the host vehicle in proportion to a magnitude of the gradient of the hill, and restart the host vehicle based on the set torque slope.

The specified condition may comprise at least one of: the driving speed of the host vehicle being decreasing and being less than or equal to a threshold speed, the required acceleration being positive, the required driving torque being greater than or equal to a specified value, or a separation distance between the host vehicle and another vehicle adjacent to the host vehicle being increasing.

A method may comprise: identifying, by a control device and by using a sensor device, host vehicle information, wherein the host vehicle information comprises at least one of: a real-time weight of a host vehicle, gear information of the host vehicle, or a driving speed of the host vehicle; identifying, by the control device and by using the host vehicle information, required driving torque that is required to drive, by using a driving device, the host vehicle on a hill on a driving route of the host vehicle; and outputting, by the control device and based on output available torque of the host vehicle being less than the required driving torque, at least one of: route change information or a transition request for transitioning a control authority for the host vehicle.

The identifying of the required driving torque may comprise: receiving, by the control device via a communication device, map information about the driving route, wherein the map information comprises at least one of: an advanced driver assistance system (ADAS) map, a precision map, a navigation map, or real-time traffic information; and identifying, by the control device and based on the map information, the required driving torque.

The identifying of the required driving torque may comprise: identifying, based on the map information and based on the host vehicle reaching a section on the driving route, section information of the section and an expected driving speed, wherein the section has a gradient greater than or equal to a specified value; and identifying, based on the section information and the expected driving speed, the required driving torque.

The method may further comprise: identifying, based on the map information and based on the output available torque being less than the required driving torque, a different driving route for providing a guide to bypass the hill; and outputting, by the control device, the route change information, wherein the route change information indicates the different driving route.

The identifying of the required driving torque may comprise: before the host vehicle reaches the hill, identifying, by using the sensor device, sensing information comprising at least one of: gradient information of the hill, road surface information of the hill, an expected driving speed of the host vehicle on the hill, an operating history of the driving device, or a performance value of the driving device; and identifying, based on the sensing information, the required driving torque.

The method may further comprise: outputting, based on the output available torque being less than the required driving torque, the transition request for transitioning the control authority for the host vehicle; and based on a control authority transition acceptance response received from a user of the host vehicle, deactivating an autonomous driving control of the host vehicle and transferring the control authority to the user.

The method may further comprise: based on a failure of receiving a control authority transition acceptance response from a user of the host vehicle, stopping the host vehicle before the host vehicle reaches the hill and outputting a notification regarding the hill.

The method may further comprise: identifying, based on a determination that the host vehicle reaches the hill, driving information comprising at least one of: the driving speed of the host vehicle, a driving speed change rate of the host vehicle, a required acceleration, the required driving torque, or a gradient of the hill; and based on the gradient of the hill and based on the driving information satisfying a specified condition, stopping the host vehicle and restarting the host vehicle.

The stopping of the host vehicle may comprise: setting, by the control device, a deceleration control amount of the host vehicle in proportion to an absolute value of the driving speed change rate and stopping the host vehicle by using the set deceleration control amount; and wherein the restarting of the host vehicle comprises: after stopping the host vehicle, setting, by the control device, a torque slope for restarting the host vehicle in proportion to a magnitude of the gradient of the hill, and restarting the host vehicle based on the set torque slope.

The specified condition may comprise at least one of: the driving speed of the host vehicle being decreasing and being less than or equal to a threshold speed, the required acceleration being positive, the required driving torque being greater than or equal to a specified value, or a separation distance between the host vehicle and another vehicle adjacent to the host vehicle being increasing.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 5 is an operation flowchart of an autonomous driving control apparatus;

Figure 1:
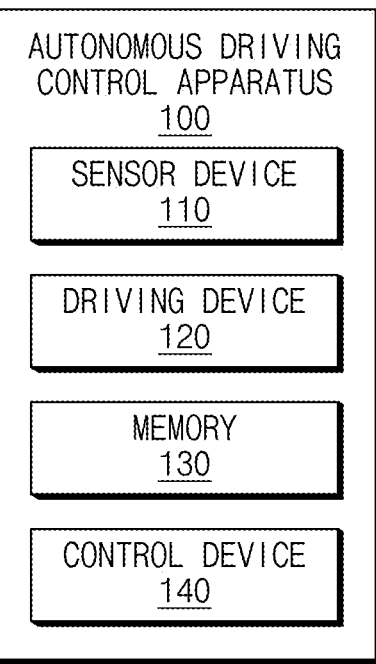
FIG. 1 is a block diagram showing components of an autonomous driving control apparatus.

With regard to description of drawings, the same or similar components will be marked by the same or similar reference signs.

DETAILED DESCRIPTION

Hereinafter, various examples of the present disclosure will be described in detail with reference to the accompanying drawings. In the drawings, the same reference numerals will be used throughout to designate the same or equivalent elements. In addition, a detailed description of well-known features or functions may be omitted in order not to unnecessarily obscure the gist of the present disclosure.

In describing elements of an embodiment of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various features of the present disclosure will be described in detail with reference to FIGS. 1 to 8.

FIG. 1 is a block diagram showing components of an autonomous driving control apparatus.

An autonomous driving control apparatus 100 may include at least one of a sensor device 110, a driving device 120, a memory 130, a control device 140, or any combination thereof. The configuration of the autonomous driving control apparatus 100 shown in FIG. 1 is an example, and aspects of the present disclosure are not limited thereto. For example, the autonomous driving control apparatus 100 may further include components (e.g., at least one of an interface device, a communication device, a sensor device, or any combination thereof) not shown in FIG. 1.

The sensor device 110 may obtain (or sense) various pieces of information used for the driving of a vehicle.

For example, the sensor device 110 may include at least one sensor including at least one of a camera (e.g., a stereo camera), radar, LiDAR, or any combination thereof.

For example, the sensor device 110 may identify host vehicle information including at least one of a real-time weight of the host vehicle, real-time information (e.g., information including the type of a gear) of the driving device 120, a real-time driving speed of the host vehicle, or any combination thereof.

For example, before the host vehicle reaches (e.g., enters into a hill section) a hill having a gradient exceeding a specified value, the sensor device 110 may identify sensing information including at least one of gradient information (e.g., the level of the gradient or whether the gradient exceeds the specified value) of the corresponding hill, road surface information of the hill, an expected driving speed of the host vehicle on the hill, an operating history of the driving device 120, performance of the driving device 120, or any combination thereof.

For example, when the host vehicle reaches the hill having the gradient exceeding the specified value, the sensor device 110 may identify driving information including at least one of the driving speed of the host vehicle, a change rate of the driving speed of the host vehicle, the required acceleration, required driving torque, the gradient of the hill, or any combination thereof.

For example, the sensor device 110 obtain information about an external object (e.g., at least one of a person, another vehicle, a building, a structure, or any combination thereof) by using at least one sensor.

For example, the sensor device 110 may obtain information about whether at least another vehicle is present and/or a driving state (e.g., at least one of a driving speed, a driving direction, a separation distance from a host vehicle, whether a vehicle is stopped, or any combination thereof).

The driving device 120 may include at least one of a motor, an engine, a gear, or any combination thereof.

For example, the driving device 120 may accelerate or decelerate the host vehicle based on torque (e.g., second requirement torque) (e.g., controlled by and/or delivered from the control device 140).

The memory 130 may store instructions and/or data. For example, the memory 130 may store one or more instructions that cause the autonomous driving control apparatus 100 to perform various operations when executed by the control device 140.

For example, the memory 130 and the control device 140 may be implemented as one chipset. The control device 140 may include at least one of a communication processor and/or a modem.

The control device 140 may be operatively coupled (e.g., connected) to the sensor device 110, the driving device 120, and/or the memory 130. For example, the control device 140 may control operations of the sensor device 110, the driving device 120, and/or the memory 130.

For example, the control device 140 may identify host vehicle information by using the sensor device 110. For example, the host vehicle information may include at least one of a real-time weight of the host vehicle, gear information of the host vehicle, a driving speed of the host vehicle, or any combination thereof.

For example, the control device 140 may identify torque required to drive each of the various sections included in the driving route, by using the host vehicle information. For example, the hill may include a section having a gradient greater than or equal to a specified value.

For example, the control device 140 may identify required driving torque required to drive a hill placed on a driving route through the driving device 120 by using host vehicle information.

For example, additionally or alternatively, the control device 140 may identify the required driving torque by using map information received through a communication device. The map information may be map information including at least one of an advanced driver assistance system (ADAS) map, a precision map, a navigation map, real-time traffic information, or any combination thereof.

For example, additionally or alternatively, the control device 140 may identify section information of a section (e.g., a section including a hill) having a gradient greater than or equal to a specified value on a driving route and an expected driving speed expected when the host vehicle reaches the corresponding section, by using map information and may identify the required driving torque by using the identified section information and/or the expected driving speed.

For example, if the output available torque of the host vehicle is less than the required driving torque, the control device 140 may provide the user with route change information and/or a request for a transition of control authority for the host vehicle.

For example, the control device 140 may identify the required driving torque by inputting various pieces of real-time information (e.g., a weight of the host vehicle, the type of a gear, and an expected driving speed expected to drive in a hill section) about the host vehicle and various pieces of information (e.g., a gradient of a hill, road surface information of the hill, and the like) about the hill into an N-dimensional map.

For example, if the output available torque is less than the required driving torque, the control device 140 may identify another driving route by using the map information. For example, the other driving route may include at least one driving route for moving to a destination without passing through a hill having a gradient higher than a specified value. In an example, the other driving route may be generated by using the map information and may include at least one driving route for providing a guide to bypass a hill.

For example, if the other driving route is identified, the control device 140 may provide the user with route change information about the other driving route. For example, the control device 140 may provide the user with recommendation information for selecting whether to control the host vehicle through a different driving route, by using an output device (e.g., at least one of a display, a sound output device, or any combination thereof). For example, the control device 140 may change the driving route of the host vehicle through a response (e.g., a touch input to a display or a voice input) to the route change information received from the user. For example, if a route change response from the user is received, the control device 140 may control the driving of the host vehicle through the other driving route.

For example, the control device 140 may identify sensing information by using the sensor device 110. For example, before the host vehicle reaches a hill, the control device 140 may identify sensing information including at least one of gradient information of the hill, road surface information, an expected driving speed of the host vehicle on the hill, an operating history of the driving device 120, performance of the driving device 120, or any combination thereof by using the sensor device 110. Additionally or alternatively, the control device 140 may identify the required driving torque by using the sensing information. In an example, if the time exceeding the specified time remains until the host vehicle enters a hill, the control device 140 may identify the required driving torque by using the map information obtained by using the communication device, and may identify the required driving torque by using the sensing information obtained by further using the sensor device 110 (e.g., immediately) before the host vehicle reaches the hill (or, when a specified time or less remains before the host vehicle enters into the hill section of the road).

For example, if the output available torque is less than the required driving torque before the host vehicle reaches the hill, the control device 140 may provide the user with a request for a transition of control authority for the host vehicle. For example, the request for the transition of control authority may include at least one user interface and/or voice guide displayed through an output device.

For example, if the control device 140 receives an acceptance response to the transition of control authority from the user, the control device 140 may deactivate (e.g., terminate) autonomous driving control of the host vehicle and may transfer control authority to the user. For example, the control device 140 may transfer the control authority to the user after stopping the host vehicle.

For example, if the control device 140 fails to receive (e.g., in a time duration, such as a preset response reception time window) the acceptance response to the transition of control authority from the user, the control device 140 may stop the host vehicle before the host vehicle reaches the hill and may provide the user with a notification related to a hill visually and/or aurally by using the output device. For example, if the driving performance of the host vehicle in front is considered, the notification about the hill may include guide information indicating that there is a driving section in which a roll-back phenomenon is expected to occur.

For example, if the host vehicle reaches the hill, the control device 140 may identify driving information by using the sensor device 110. For example, the driving information may include at least one of the driving speed of the host vehicle, a driving speed change rate of the host vehicle, a required acceleration, required driving torque, a gradient of a hill, or any combination thereof. For example, the required acceleration may include a control amount, which is provided by the autonomous driving control apparatus 100 to at least part of driving devices, to control the host vehicle.

For example, if the driving information satisfies a specified condition, the control device 140 may stop the host vehicle, and may restart the host vehicle based on a hill gradient. For example, the specified condition may include a case in which the driving speed of the host vehicle is decreasing while being less than or equal to a threshold speed, a case in which the required acceleration is positive, a case in which the required driving torque is greater than or equal to the specified value, a case in which a separation distance between the host vehicle and another vehicle adjacent to the host vehicle is increasing, or any combination thereof.

For example, if the driving information satisfies the specified condition, the control device 140 may set deceleration control amount of the host vehicle in proportion to an absolute value of the driving speed change rate and may stop the host vehicle by using the set deceleration control amount. In an example, as a slope at which the driving speed of the host vehicle decreases is great (e.g., greater than a threshold value) while the host vehicle is driving the hill, the control device 140 may set a high deceleration control amount for stopping the host vehicle.

For example, if the driving information satisfies the specified condition, after stopping the host vehicle, the control device 140 may set a torque slope for restarting the host vehicle based on the level of a hill gradient, and may restart the host vehicle based on the set torque slope. In an example, the control device 140 may set a torque slope for restarting the host vehicle to be great (e.g., set the value to a greater value) as the slope of the hill increases.

For example, the memory 130 may store various pieces of information related to the autonomous driving control apparatus 100. For example, the memory 130 may store information about the operation history of the control device 140. For example, the memory 130 may store information related to states and/or operations of components (e.g., at least one of an engine control unit (ECU), the sensor device 110, the driving device 120, the control device 140, or any combination thereof) of the host vehicle.

The autonomous driving 100 control apparatus may further include a display device.

For example, the display device may include at least one output device. For example, the display device may include the output device (e.g., a display) included in at least part of the interior of the host vehicle.

For example, the display device may provide the user with various pieces of information about the driving situation of the host vehicle (e.g., through visual content and/or audible outputs).

For example, the display device may provide a request for a transition of control authority of the host vehicle. For example, the display device may visually and/or audibly provide information about a request for the transition of control authority to a user riding the host vehicle based on visual and/or auditory content.

The autonomous driving control may apparatus 100 further include a communication device.

The communication device may establish a communication channel (e.g., wireless communication channel) between the autonomous driving control apparatus 100 and an external device (e.g., a navigation device or an external server) and may support communication through the established communication channel. For example, the communication device may include one or more communication processors (e.g., which are operated independently of the control device 140, such as an application processor) and support direct (or wired) communication or wireless communication.

For example, the communication device may include a wireless communication module (e.g., a cellular communication module, a short range wireless communication module, and/or a global navigation satellite system (GNSS) communication module) and/or a wired communication module (e.g., a local area network (LAN) communication module and/or a power line communication module). The corresponding communication module among these communication modules may communicate with an external device through a first network (e.g., a short-range communication network such as Bluetooth, wireless fidelity (WiFi) direct or infrared data association (IrDA)) or a second network (e.g., a legacy cellular network, 5G networks, next-generation communication networks, Internet, or telecommunication networks such as computer networks (e.g., LAN or WAN)) included in a network. The above-described kinds of communication modules may be integrated in one component (e.g., a single chip) or may be implemented with a plurality of components (e.g., a plurality of chips) which may be independent of each other. Also, the communication device and the control device 140 may be implemented as a single chip.

For example, the communication device may transmit or receive pieces of various data based on communication with an external device.

For example, the communication device may receive, from an external device, map information about a driving route including at least one of an advanced driver assistance system (ADAS) map, a precision map, a navigation map, real-time traffic information, or any combination thereof.

Figure 2:
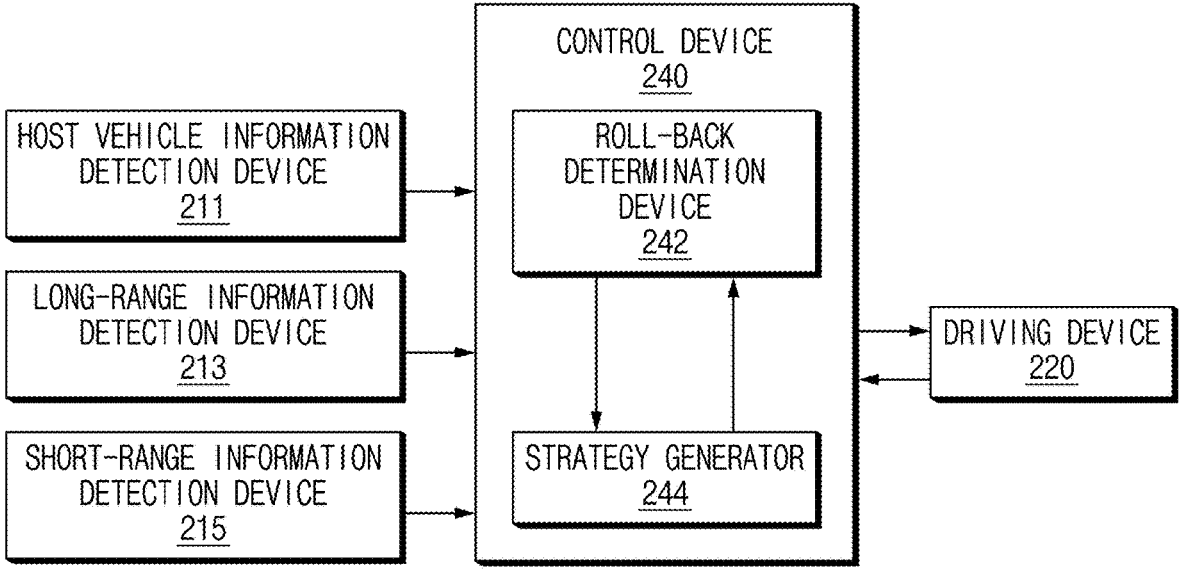
FIG. 2 is a block diagram showing components of an autonomous driving control apparatus.

FIG. 2 is a block diagram showing components of an autonomous driving control apparatus.

An autonomous driving control apparatus (e.g., the autonomous driving control apparatus 100 of FIG. 1) may include at least one of a host vehicle information detection device 211, a long-range information detection device 213, a short-range information detection device 215, a control device 240 (e.g., the control device 140 in FIG. 1), a driving device 220 (e.g., the driving device 120 in FIG. 1), or any combination thereof. For example, the control device 240 may include a roll-back determination device 242 and a strategy generator 244.

Components of the autonomous driving control apparatus illustrated in FIG. 2 are examples, and aspects of the present disclosure are not limited thereto. For example, at least part of components (e.g., the host vehicle information detection device 211, the long-range information detection device 213, the short-range information detection device 215) shown in FIG. 2 to be distinguished from the control device 240 may be implemented as a single chip with the control device 240.

For example, the host vehicle information detection device 211 may obtain various pieces of information about a host vehicle in real time and may deliver the obtained information to the control device 240.

For example, the host vehicle information detection device 211 may identify at least one of host vehicle weight information, host vehicle gear information (e.g., the type of a gear, a wear condition of a gear, or an operating history of a gear), host vehicle tire information (e.g., a tire type, a tire wear condition, or a tire operating history), or any combination thereof and may deliver the identified information to the control device 240.

For example, the long-range information detection device 213 may obtain information of a host vehicle or various pieces of information related to a driving environment by using communication with external devices and/or at least one sensor device and may deliver the obtained information to the control device 240.

For example, the long-range information detection device 213 may obtain at least one of gradient information, road surface information, traffic situation information (e.g., at least one of traffic volume, expected arrival time, expected driving speed when the host vehicle enters a section, or any combination thereof), at least one driving route capable of being driven to a destination, or any combination thereof for each of various sections (e.g., a hill) placed on a driving route of the host vehicle and may deliver the obtained result to the control device 240.

For example, the short-range information detection device 215 may obtain information of the host vehicle or various pieces of information related to a driving environment by using a sensor device (e.g., the sensor device 110 of FIG. 1) and may deliver the obtained information to the control device 240.

For example, the short-range information detection device 215 may obtain at least one of gradient information, road surface information, traffic situation information, or any combination thereof for each of various sections placed on the driving route of the host vehicle, and may deliver the obtained information to the control device 240. The short-range information detection device 215 may obtain information about a hill in front of the host vehicle by using at least one of a camera, LiDAR, radar, or any combination thereof and may deliver the information to the control device 240.

For example, the driving device 220 may deliver at least one of the real-time driving speed of the host vehicle, the driving speed change rate of the host vehicle, the output available torque of the host vehicle, or any combination thereof to the control device 240.

For example, the roll-back determination device 242 may determine whether the roll-back of the host vehicle occurs and/or whether roll-back is expected, by using at least part of pieces of information obtained through at least one of the host vehicle information detection device 211, the long-range information detection device 213, the short-range information detection device 215, the driving device 220, or any combination thereof.

For example, the roll-back determination device 242 may determine whether a roll-back phenomenon in the specified section (e.g., a hill) occurs or is expected to occur, and may deliver the determination result to the strategy generator 244.

For example, the strategy generator 244 may generate a driving parameter required for the host vehicle to drive in a specified section and may deliver the driving parameter to the roll-back determination device 242 and/or the driving device 220.

For example, the hill strategy generator 244 may deliver a required acceleration, which is required when the host vehicle is driving on a hill, to the roll-back determination device 242 and/or the driving device 220.

For example, the driving device 220 may control driving of the host vehicle based on the required acceleration thus received. Nevertheless, a situation in which the acceleration of the actual host vehicle does not follow the required acceleration based on the gradient of the hill or the performance of the driving device may occur. The driving device 220 may deliver the driving speed, driving acceleration, driving speed change rate, or the like of the host vehicle to the control device 240 in real time again.

For example, the control device 240 may continuously perform roll-back determination by using pieces of information received from the driving device 220. For example, if it is determined that roll-back continuously occurs or is expected to occur (e.g., when output available torque is less than required driving torque), the control device 240 may provide a user with route change information or a request for a transition of control authority for the host vehicle.

Figure 3:
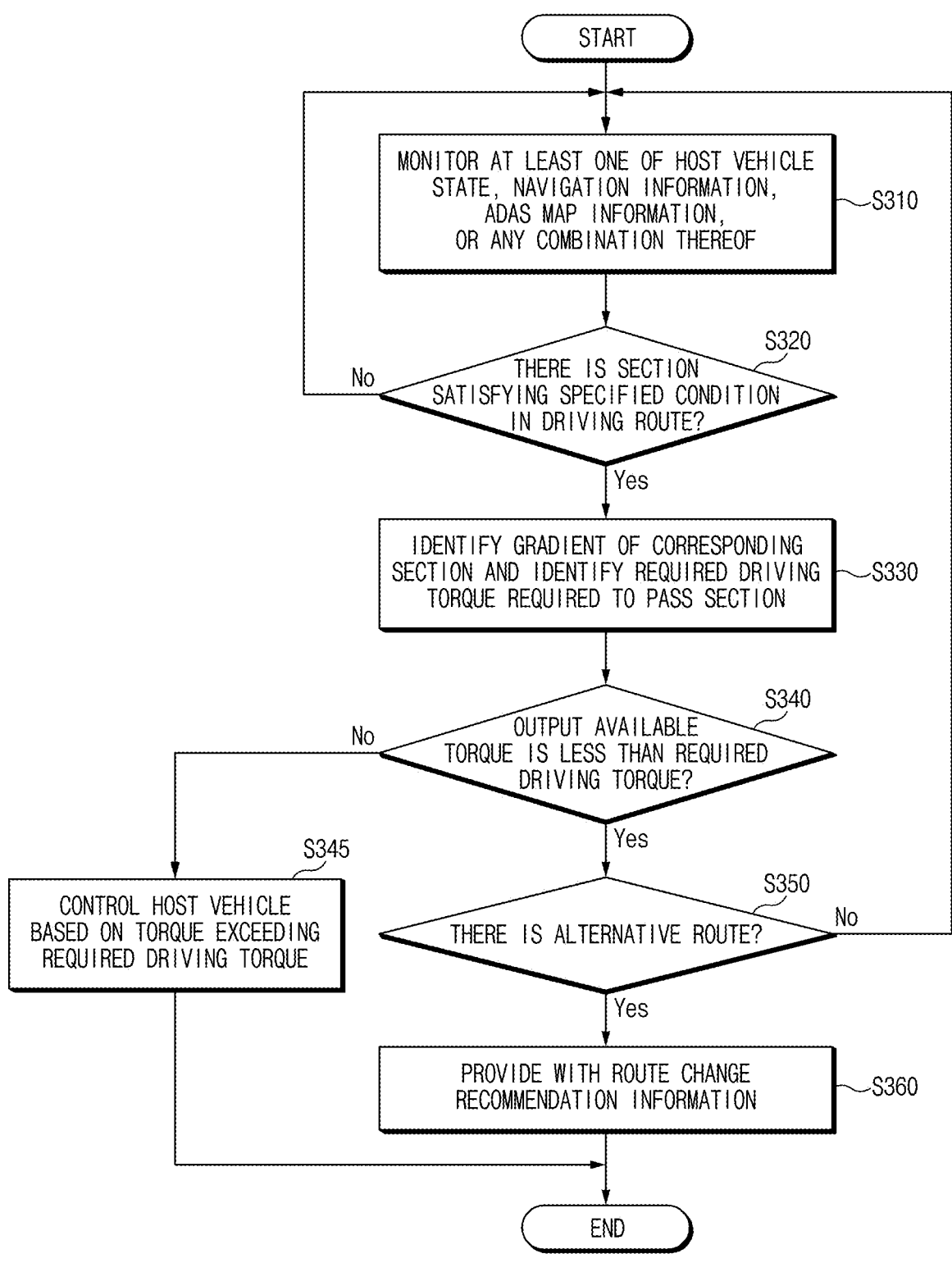
FIG. 3 is an operation flowchart of an autonomous driving control apparatus.

FIG. 3 is an operation flowchart of an autonomous driving control apparatus.

An autonomous driving control apparatus (e.g., the autonomous driving control apparatus 100 of FIG. 1) may perform operations described in FIG. 3. For example, at least some of components (e.g., the sensor device 110, the driving device 120, and/or the control device 140 of FIG. 1) the memory 130, included in the autonomous driving control apparatus may be configured to perform the operations of FIG. 3.

Operation S310 to operation S360 may be sequentially performed, but may not be necessarily performed sequentially in some implementations. For example, the order of operations may be changed, and at least two operations may be performed in parallel. Moreover, descriptions corresponding to or identical to the above-mentioned descriptions given with reference to FIG. 3 may be briefly described or omitted to avoid redundancy.

The autonomous driving control apparatus may monitor at least one of a host vehicle state, navigation information, ADAS map information, or any combination thereof (S310).

For example, the autonomous driving control apparatus may monitor the host vehicle state including at least one of a real-time weight of the host vehicle, gear information of the host vehicle, a driving speed of the host vehicle, or any combination thereof.

For example, the autonomous driving control apparatus may receive and monitor map information about a driving route including at least one of an ADAS map, a precision map, a navigation map, real-time traffic information, or any combination thereof by using a communication device.

The autonomous driving control apparatus may determine whether there is a section satisfying a specified condition in a driving route (S320).

For example, the autonomous driving control apparatus may identify section information (e.g., at least one of gradient information of a hill, road surface information of the hill, or any combination thereof) of a section (e.g., a hill) whose gradient on the driving route is greater than or equal to a specified value. For example, the autonomous driving control apparatus may further identify an expected driving speed at which the host vehicle is expected to drive when entering into the identified section.

For example, if the section satisfying a specified condition is present (e.g., S320—Yes), the autonomous driving control apparatus may perform S330.

For example, if there is no section satisfying the condition (e.g., S320—No), the autonomous driving control apparatus may return to operation S310.

The autonomous driving control apparatus may identify a gradient of the corresponding section and may identify the required driving torque required to pass the section (S330).

For example, the autonomous driving control apparatus may identify the required driving torque by inputting various pieces of real-time information (e.g., a weight of the host vehicle, the type of a gear, and an expected driving speed expected to drive in a hill section) about the host vehicle and various pieces of information (e.g., a gradient of a hill, road surface information of the hill, and the like) about the hill into an N-dimensional map. For example, the required driving torque may be defined as the minimum driving torque required to pass the corresponding section.

The autonomous driving control apparatus may determine whether the output available torque is less than the required driving torque (S340).

For example, the output available torque may be defined as the maximum torque is capable of output by the host vehicle.

For example, if the output available torque is less than the required driving torque (e.g., operation S340—Yes), the autonomous driving control apparatus may perform operation S350.

For example, if the output available torque is not less than the required driving torque (e.g., operation S340—No) (e.g., when the output available torque is greater than or equal to the required driving torque), the autonomous driving control apparatus may perform operation S345.

The autonomous driving control apparatus may control the host vehicle based on torque exceeding the required driving torque (S345).

For example, the autonomous driving control apparatus may control the driving of the host vehicle in the section satisfying the specified condition by using driving torque greater than or equal to the required driving torque.

The autonomous driving control apparatus may determine whether there is an alternative route (S350).

For example, the autonomous driving control apparatus may determine whether there is another driving route with no section, whose gradient exceeds the specified value among various routes, on each of which the host vehicle is capable of driving to the destination, by using at least part of the map information.

For example, when the alternative route is present (e.g., operation S350—Yes), the autonomous driving control apparatus may perform operation S360.

For example, when there is no alternative route (e.g., S350—No), the autonomous driving control apparatus may repeatedly perform S310.

The autonomous driving control apparatus may provide the user with route change recommendation information (S360).

For example, the autonomous driving control apparatus may additionally or alternatively provide a request for a transition of control authority for the host vehicle.

For example, the autonomous driving control apparatus may provide a user with recommendation information for selecting whether to control a host vehicle through a different driving route, by using an output device.

For example, the autonomous driving control apparatus may change the driving route of the host vehicle through a response (e.g., a touch input to a display or a voice input) to the route change information received from the user. For example, if a route change response from the user is received, the autonomous driving control apparatus may control the driving of the host vehicle through the other driving route.

Figure 4:
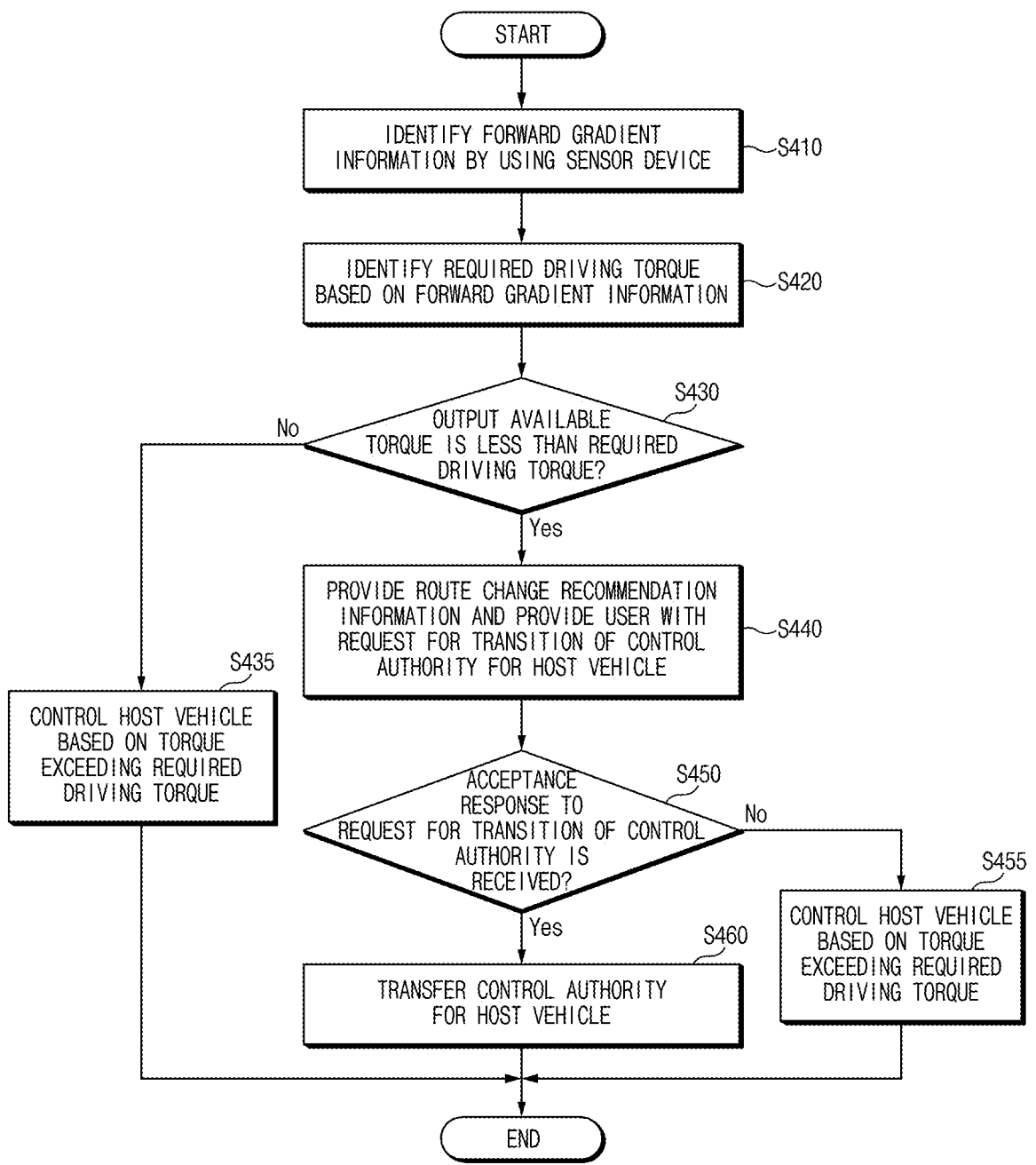
FIG. 4 is an operation flowchart of an autonomous driving control apparatus.

FIG. 4 is an operation flowchart of an autonomous driving control apparatus.

An autonomous driving control apparatus (e.g., the autonomous driving control apparatus 100 of FIG. 1) may perform operations described in FIG. 4. For example, at least some of components (e.g., the sensor device 110, the driving device 120, the memory 130, and/or the control device 140 of FIG. 1) included in the autonomous driving control apparatus may be configured to perform the operations of FIG. 4.

Operation S410 to operation S460 may be sequentially performed, but may not be necessarily performed sequentially in some implementations. For example, the order of operations may be changed, and at least two operations may be performed in parallel. Moreover, descriptions corresponding to or identical to the above-mentioned descriptions given with reference to FIG. 4 may be briefly described or omitted to avoid redundancy.

Moreover, for example, operation S410 shown in FIG. 4 may correspond to a subsequent operation when the autonomous driving control apparatus performs operation S360 of FIG. 3 described above and fails to receive a route change response from a user, but aspects of the present disclosure are not limited thereto. For operations of FIG. 3 and operations of FIG. 4 may be performed independently from one another.

The autonomous driving control apparatus may identify forward gradient information by using a sensor device (S410).

For example, the autonomous driving control apparatus may identify gradient information of a section in front of the host vehicle by using at least one of a camera (e.g., a stereo camera), radar, LiDAR, or any combination thereof.

The autonomous driving control apparatus may identify required driving torque based on forward gradient information (S420).

For example, the autonomous driving control apparatus may identify the minimum value of driving torque required for a host vehicle to pass through a section with a forward gradient, by using forward gradient information.

The autonomous driving control apparatus may determine whether the output available torque is less than the required driving torque (S430).

For example, if the output available torque is less than the required driving torque (e.g., operation S430—Yes), the autonomous driving control apparatus may perform operation S440.

For example, if the output available torque is not less than the required driving torque (e.g., operation S430—No) (e.g., when the output available torque is greater than or equal to the required driving torque), the autonomous driving control apparatus may perform operation S435.

The autonomous driving control apparatus may control the host vehicle based on torque exceeding the required driving torque (S435).

For example, the autonomous driving control apparatus may control the driving of the host vehicle in the section satisfying the specified condition by using driving torque greater than or equal to the required driving torque.

The autonomous driving control apparatus may provide route change recommendation information and may provide the user with a request for a transition of control authority for the host vehicle (S440).

For example, the autonomous driving control apparatus may provide the user with route change recommendation information for proposing that the user will drive to a destination through another route because it is difficult to pass a front section, through an output device.

For example, the autonomous driving control apparatus may provide the user with a request for a transition of control authority for proposing the transition of control authority for the host vehicle, through the output device.

The autonomous driving control apparatus may determine whether an acceptance response to the request for the transition of control authority is received from the user (S450).

For example, the acceptance response to the request for the transition of control authority may be received through a response (e.g., a touch input on a display or a voice input) to the user's route change recommendation information.

For example, if the acceptance response to the request for the transition of control authority is received from the user (e.g., operation S450—Yes), the autonomous driving control apparatus may perform operation S460.

For example, if the acceptance response to the request for the transition of control authority is not received from the user (e.g., operation S450—No), the autonomous driving control apparatus may perform operation S455.

The autonomous driving control apparatus may control the host vehicle based on torque exceeding the required driving torque (S455).

For example, the autonomous driving control apparatus may control the driving of the host vehicle in the section satisfying the specified condition by using driving torque greater than or equal to the required driving torque.

The autonomous driving control apparatus may transfer the control authority for the host vehicle (S460).

For example, the autonomous driving control apparatus provides the user with the control authority for the host vehicle and may deactivate (e.g., terminate) autonomous driving control for the host vehicle.

FIG. 5 is an operation flowchart of an autonomous driving control apparatus.

An autonomous driving control apparatus (e.g., the autonomous driving control apparatus 100 of FIG. 1) may perform operations described in FIG. 5. For example, at least some of components (e.g., the sensor device 110, the driving device 120, the memory 130, and/or the control device 140 of FIG. 1) included in the autonomous driving control apparatus may be configured to perform the operations of FIG. 5.

Operation S510 to operation S570 may be sequentially performed, but may not be necessarily performed sequentially in some implementations. For example, the order of operations may be changed, and at least two operations may be performed in parallel. Moreover, descriptions corresponding to or identical to the above-mentioned descriptions given with reference to FIG. may be briefly described or omitted to avoid redundancy.

For example, operation S510 shown in FIG. 5 may correspond to a subsequent operation when the autonomous driving control apparatus performs operation S360 of FIG. 3 and/or operation S460 of FIG. 4 described above and fails to receive a route change response from a user, but aspects of the present disclosure are not limited thereto. For example, operations of FIGS. 3 to 5 may be performed independently from each other.

For example, operation S510 to operation S570 to be described below may be referred to as an example case in which a host vehicle is driving in a section (e.g., hill) having a gradient exceeding a specified gradient value.

The autonomous driving control apparatus may monitor a host vehicle state (S510).

For example, the autonomous driving control apparatus may identify driving information including at least one of the driving speed of the host vehicle, a change rate of the driving speed of the host vehicle, a required acceleration, required driving torque, a gradient of a hill, or any combination thereof.

The autonomous driving control apparatus may determine whether the driving speed of the host vehicle is decreasing (S520).

For example, the autonomous driving control apparatus may determine whether the driving speed is lower than or equal to a threshold speed and is continuously decreasing in a situation where the host vehicle is driving on a hill.

For example, if the driving speed of the host vehicle is decreasing (e.g., operation S520—Yes), the autonomous driving control apparatus may perform operation S530.

For example, if the driving speed of the host vehicle is not decreasing (e.g., operation S520—No), the autonomous driving control apparatus may return to the operation S510.

The autonomous driving control apparatus may determine whether at least one of a driving state of the host vehicle, a required acceleration of the host vehicle, torque of the host vehicle, a distance from another vehicle, or any combination thereof satisfies a specified condition (S530).

For example, if the host vehicle is in a driving state, a required acceleration is positive, required driving torque is greater than or equal to a specified value, and a distance from another vehicle (e.g., a vehicle in front of the host vehicle) is increasing, the autonomous driving control apparatus may determine that the specified condition is satisfied. The conditions listed in this paragraph are examples, and aspects of the present disclosure are not limited thereto. For example, the autonomous driving control apparatus may determine that the specified condition is satisfied even when at least part of the above-described conditions is satisfied.

For example, if at least one of a driving state of the host vehicle, a required acceleration of the host vehicle, torque of the host vehicle, a distance from another vehicle, or any combination thereof satisfies the specified condition (e.g., operation S530—Yes), the autonomous driving control apparatus may perform operation S540.

For example, if at least one of a driving state of the host vehicle, a required acceleration of the host vehicle, torque of the host vehicle, a distance from another vehicle, or any combination thereof (e.g., the driving state of the host vehicle, the required acceleration of the host vehicle, torque of the host vehicle, and the distance) does not satisfy the specified condition (e.g., operation S530—No), the autonomous driving control apparatus may repeat operation S510.

The autonomous driving control apparatus may determine whether the driving speed of the host vehicle is less than the specified speed (S540).

For example, the autonomous driving control apparatus may determine whether the driving speed of the host vehicle is less than or equal to a predetermined minimum driving speed. The minimum driving speed may be a changeable value by user's settings or manufacturer's settings.

For example, if the driving speed of the host vehicle is less than the specified speed (e.g., operation S540—Yes), the autonomous driving control apparatus may perform operation S550.

For example, if the driving speed of the host vehicle is greater than or equal to the specified speed (e.g., operation S540—No), the autonomous driving control apparatus may repeat operation S510.

The autonomous driving control apparatus may perform stop control of the host vehicle by using the driving speed reduction slope (S550).

For example, the autonomous driving control apparatus may set a deceleration control amount of the host vehicle in proportion to an absolute value of the driving speed change rate and may stop the host vehicle by using the set deceleration control amount.

The autonomous driving control apparatus may attempt to control the restart of the host vehicle by using gradient information of the driving road (S560).

For example, the autonomous driving control apparatus may set a torque slope for restarting the host vehicle in proportion to the gradient of the hill and may attempt to control the restart of the host vehicle based on the set torque slope.

After allowing the host vehicle to be stopped again in case of restart failure, the autonomous driving control apparatus may provide a request for a transition of control authority (S570).

For example, if it is determined that a host vehicle is incapable of normally driving in a section (e.g., because a hill gradient is too high for the host vehicle to restart), the autonomous driving control apparatus may identify that a restart attempt is unsuccessful, and may allow the host vehicle to a standstill. In this case, the autonomous driving control apparatus may provide the user with a request for the transition of control authority.

Figure 6:
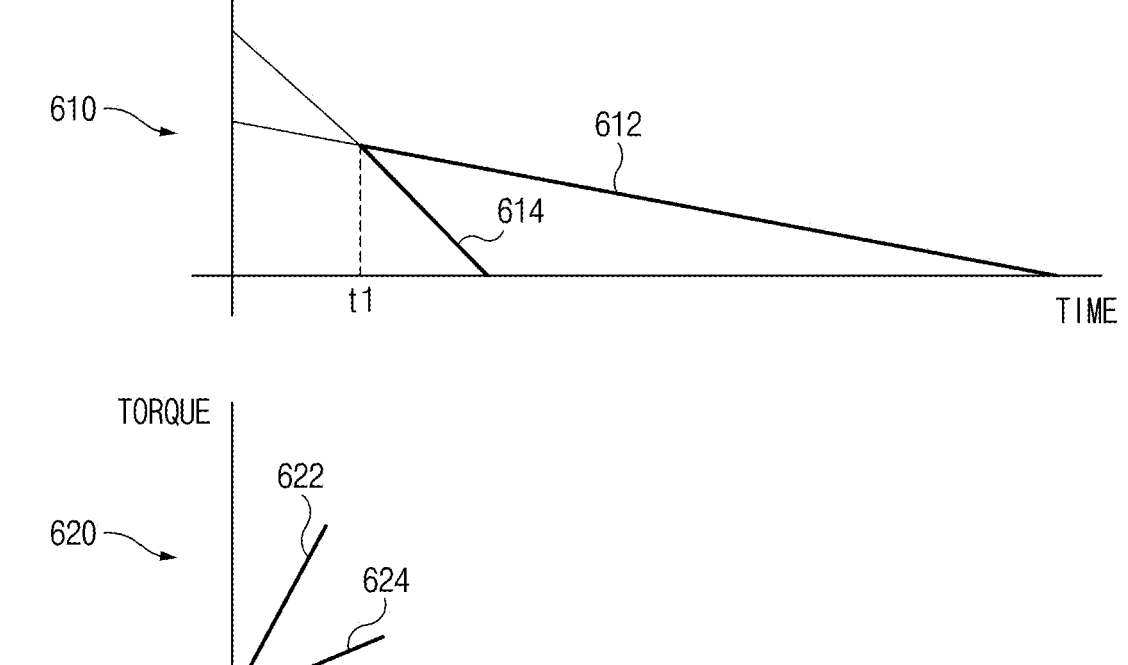
FIG. 6 is a conceptual diagram illustrating a control amount used when an autonomous driving control apparatus controls a host vehicle.

FIG. 6 is a conceptual diagram illustrating a control amount used when an autonomous driving control apparatus controls a host vehicle.

Referring to reference number 610, an autonomous driving control apparatus (e.g., the autonomous driving control apparatus 100 of FIG. 1) may perform deceleration control on a host vehicle by using a driving speed change rate.

For example, in a situation where the host vehicle is experiencing a roll-back phenomenon while driving on a hill with a gradient greater than or equal to a specified value, when the driving speed of the host vehicle decreases, the autonomous driving control apparatus may set a deceleration control amount for deceleration control for the host vehicle by using the change rate (or a decrease rate) of the driving speed. For example, the autonomous driving control apparatus may set a deceleration control amount of the host vehicle in proportion to an absolute value of the driving speed change rate.

For example, the change rate of the driving speed of the host vehicle according to reference number 612 may have an absolute value smaller than the change rate of the driving speed of the host vehicle according to.

For example, the autonomous driving control apparatus may start stop control on the host vehicle at a first time t1. In this case, in a situation according to reference number 614 where the absolute value of the driving speed change rate is large, the autonomous driving control apparatus may use a deceleration control amount larger than the deceleration control amount in a situation according to reference number 612 for stop control of the host vehicle.

Referring to reference number 620, after stopping the host vehicle based on control according to reference number 610, the autonomous driving control apparatus may set a torque slope for restarting the host vehicle by using the gradient of the hill.

For example, the autonomous driving control apparatus may completely stop the host vehicle based on the control according to reference number 610 and may start driving the host vehicle again.

For example, a situation according to reference number 622 may be referred to as a situation in which the gradient of the hill, on which the host vehicle is driving, is larger than a situation according to reference number 624.

For example, in a situation according to reference number 622 where the gradient of hill is relatively large, the autonomous driving control apparatus may restart the host vehicle based on a torque slope greater than a torque slope in the situation according to reference number 624 where the gradient of the hill is relatively small.

Figure 7:
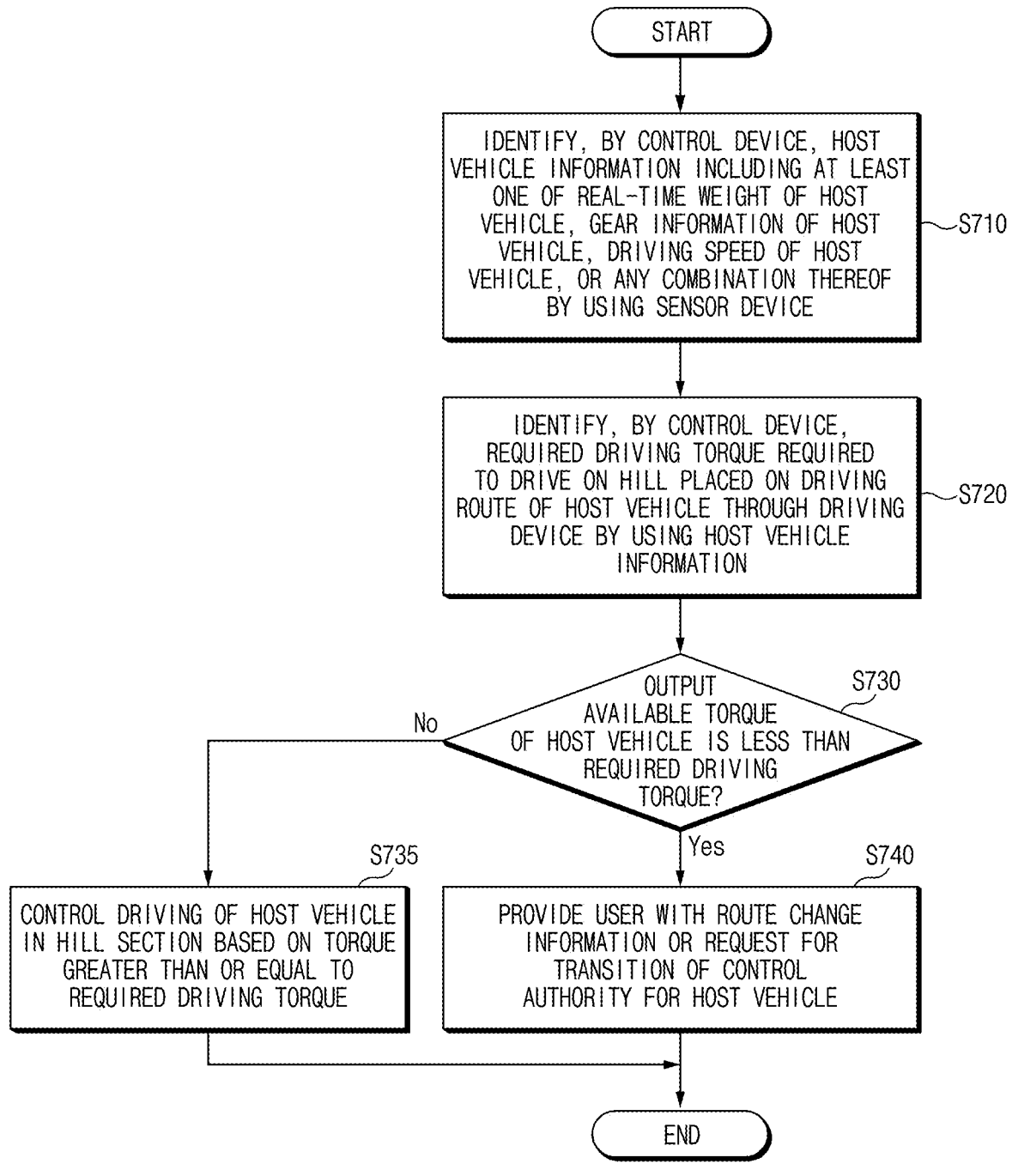
FIG. 7 is an operation flowchart of an autonomous driving control apparatus.

FIG. 7 is an operation flowchart of an autonomous driving control apparatus.

An autonomous driving control apparatus (e.g., the autonomous driving control apparatus 100 of FIG. 1) may perform operations described in FIG. 7. For example, at least some of components (e.g., the sensor device 110, the driving device 120, and/or the control device 140 of FIG. 1) the memory 130, included in the autonomous driving control apparatus may be configured to perform the operations of FIG. 7.

Operation S710 to operation S740 may be sequentially performed, but may not be necessarily performed sequentially in some implementations. For example, the order of operations may be changed, and at least two operations may be performed in parallel. Moreover, descriptions corresponding to or identical to the above-mentioned descriptions given with reference to FIG. 7 may be briefly described or omitted to avoid redundancy.

For example, the autonomous driving control apparatus may identify host vehicle information including at least one of a real-time weight of the host vehicle, gear information of the host vehicle, a driving speed of the host vehicle, or any combination thereof by using a sensor device (S710).

The autonomous driving control apparatus may identify the required driving torque required to drive on a hill placed on a driving route of the host vehicle through a driving device by using host vehicle information (S720).

The autonomous driving control apparatus may determine whether output available torque of the host vehicle is less than the required driving torque (S730).

For example, if the output available torque of the host vehicle is less than the required driving torque (e.g., operation S730—Yes), the autonomous driving control apparatus may perform operation S740.

For example, if the output available torque of the host vehicle is greater than or equal to the required driving torque (e.g., operation S730—No), the autonomous driving control apparatus may perform operation S735.

The autonomous driving control apparatus may control the driving of the host vehicle in a hill section based on torque greater than or equal to the required driving torque (S735).

The autonomous driving control apparatus may provide a user with route change information or a request for a transition of control authority for the host vehicle (S740).

According to the one or more aspects of the present disclosure, an autonomous driving control apparatus includes a sensor device, a driving device, a memory that stores instructions, and a control device operatively connected to the sensor device, the driving device, and the memory. For example, the instructions, when executed by the control device, may cause the autonomous driving control apparatus to identify host vehicle information including at least one of a real-time weight of a host vehicle, gear information of the host vehicle, a driving speed of the host vehicle, or a combination of the real-time weight, the gear information, and the driving speed by using the sensor device, to identify required driving torque required to drive on a hill placed on a driving route of the host vehicle through the driving device by using the host vehicle information, and to provide a user with route change information, or provide a transition request for control authority for the host vehicle when output available torque of the host vehicle is less than the required driving torque.

The autonomous driving control apparatus may further include a communication device. For example, the instructions, when executed by the control device, may cause the autonomous driving control apparatus to receive map information about the driving route including at least one of an advanced driver assistance system (ADAS) map, a precision map, a navigation map, real-time traffic information, or a combination of the ADAS map, the precision map, the navigation map, and the real-time traffic information by using the communication device, and to identify the required driving torque by further using the map information.

The instructions, when executed by the control device, may cause the autonomous driving control apparatus to identify section information of a section having a gradient greater than or equal to a specified value on a driving route and an expected driving speed expected when the host vehicle enters the section, by using the map information, and to identify the required driving torque by further using the section information and the expected driving speed.

The instructions, when executed by the control device, may cause the autonomous driving control apparatus to identify a different driving route for providing a guide to bypass the hill by using the map information when the output available torque is less than the required driving torque, to provide the user with the route change information about the different driving route when the different driving route is identified, and to allow the host vehicle to drive through the different driving route when a route change response is received from the user.

The instructions, when executed by the control device, may cause the autonomous driving control apparatus to identify sensing information including at least one of gradient information of the hill, road surface information of the hill, an expected driving speed of the host vehicle on the hill, an operating history of the driving device, performance of the driving device, or a combination of the gradient information, the road surface information, the expected driving speed, the operating history, and the performance, by using the sensor device before the host vehicle enters the hill, and to identify the required driving torque by further using the sensing information.

The instructions, when executed by the control device, may cause the autonomous driving control apparatus to provide the user with the transition request of the control authority for the host vehicle when the output available torque is less than the required driving torque, and to terminate autonomous driving control of the host vehicle and to transfer the control authority to the user when receiving a control authority transition acceptance response from the user.

The instructions, when executed by the control device, may cause the autonomous driving control apparatus to stop the host vehicle before the host vehicle enters the hill and to provide the user with a notification regarding the hill when failing to receive the control authority transition acceptance response from the user.

The instructions, when executed by the control device, may cause the autonomous driving control apparatus to identify driving information including at least one of the driving speed of the host vehicle, a driving speed change rate of the host vehicle, a required acceleration, the required driving torque, a gradient of the hill, or a combination of the driving speed, the driving speed change rate, the required acceleration, the required driving torque, and the gradient of the hill when the host vehicle enters the hill, and to stop the host vehicle and then to restart the host vehicle based on the gradient of the hill when the driving information satisfies a specified condition.

The instructions, when executed by the control device, may cause the autonomous driving control apparatus to set a deceleration control amount of the host vehicle in proportion to an absolute value of the driving speed change rate and to stop the host vehicle by using the set deceleration control amount, and to set a torque slope for restarting the host vehicle in proportion to the magnitude of the gradient of the hill, and to restart the host vehicle based on the set torque slope after the host vehicle, when the driving information satisfies the specified condition.

The specified condition includes one of a first case that the driving speed of the host vehicle is decreasing while being less than or equal to a threshold speed, a second case that the required acceleration is positive, a third case that the required driving torque is greater than or equal to a specified value, a fourth case that a separation distance between the host vehicle and another vehicle adjacent to the host vehicle is increasing, or a combination of the first case, the second case, the third case, and the fourth case.

According to the one or more aspects of the present disclosure, an autonomous driving control method includes identifying, by a control device, host vehicle information including at least one of a real-time weight of a host vehicle, gear information of the host vehicle, a driving speed of the host vehicle, or a combination of the real-time weight, the gear information, and the driving speed by using a sensor device, identifying, by the control device, required driving torque required to drive on a hill placed on a driving route of the host vehicle through a driving device by using the host vehicle information, and providing, by the control device, a user with route change information, or providing a transition request for control authority for the host vehicle when output available torque of the host vehicle is less than the required driving torque.

The identifying, by the control device, of the required driving torque may include receiving, by the control device, map information about the driving route including at least one of an ADAS map, a precision map, a navigation map, real-time traffic information, or a combination of the ADAS map, the precision map, the navigation map, and the real-time traffic information by using a communication device and identifying, by the control device, the required driving torque by further using the map information.

The identifying, by the control device, of the required driving torque may include identifying, by the control device, section information of a section having a gradient greater than or equal to a specified value on a driving route and an expected driving speed expected when the host vehicle enters the section, by using the map information, and identifying, by the control device, the required driving torque by further using the section information and the expected driving speed.

The autonomous driving controlling method may further include identifying, by the control device, a different driving route for providing a guide to bypass the hill by using the map information when the output available torque is less than the required driving torque, and providing, by the control device, the user with the route change information about the different driving route when the different driving route is identified.

The identifying, by the control device, of the required driving torque may include identifying, by the control device, sensing information including at least one of gradient information of the hill, road surface information of the hill, an expected driving speed of the host vehicle on the hill, an operating history of the driving device, performance of the driving device, or a combination of the gradient information, the road surface information, the expected driving speed, the operating history, and the performance, by using the sensor device before the host vehicle enters the hill, and identifying, by the control device, the required driving torque by further using the sensing information.

The autonomous driving controlling method may further include providing, by the control device, the user with the transition request of the control authority for the host vehicle when the output available torque is less than the required driving torque, and terminating, by the control device, autonomous driving control of the host vehicle and transferring the control authority to the user when receiving a control authority transition acceptance response from the user.

The autonomous driving controlling method may further include stopping, by the control device, the host vehicle before the host vehicle enters the hill and providing the user with a notification regarding the hill when failing to receive the control authority transition acceptance response from the user.

The autonomous driving controlling method may further include identifying, by the control device, driving information including at least one of the driving speed of the host vehicle, a driving speed change rate of the host vehicle, a required acceleration, the required driving torque, a gradient of the hill, or a combination of the driving speed, the driving speed change rate, the required acceleration, the required driving torque, and the gradient of the hill when the host vehicle enters the hill and stopping, by the control device, the host vehicle and then restarting the host vehicle based on the gradient of the hill when the driving information satisfies a specified condition.

The stopping, by the control device, of the host vehicle and then the restarting of the host vehicle based on the gradient of the hill when the driving information satisfies a specified condition may include setting, by the control device, a deceleration control amount of the host vehicle in proportion to an absolute value of the driving speed change rate and stopping the host vehicle by using the set deceleration control amount, and setting, by the control device, a torque slope for restarting the host vehicle in proportion to the magnitude of the gradient of the hill, and restarting the host vehicle based on the set torque slope after stopping the host vehicle.

The specified condition includes one of a first case that the driving speed of the host vehicle is decreasing while being less than or equal to a threshold speed, a second case that the required acceleration is positive, a third case that the required driving torque is greater than or equal to a specified value, a fourth case that a separation distance between the host vehicle and another vehicle adjacent to the host vehicle is increasing, or a combination of the first case, the second case, the third case, and the fourth case.

Figure 8:
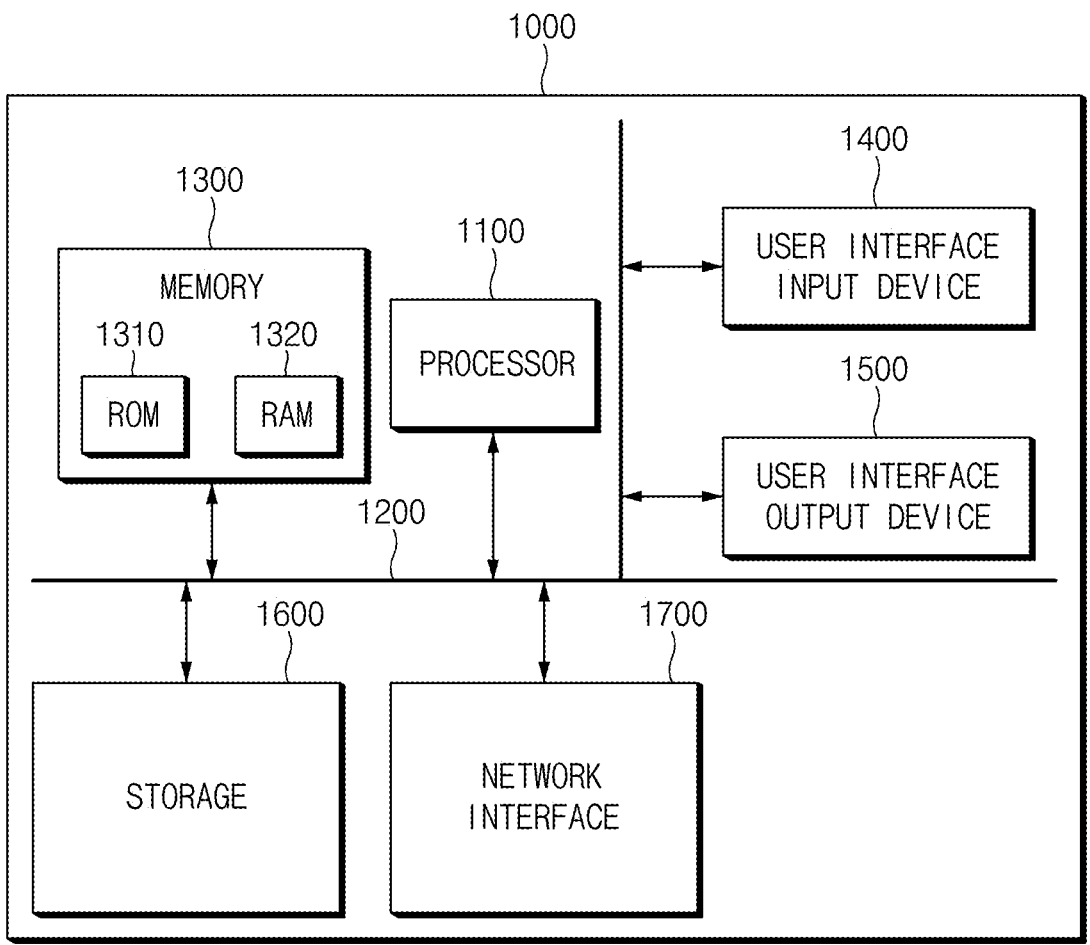
FIG. 8 illustrates a computing system related to an autonomous driving control method.

FIG. 8 illustrates a computing system related to an autonomous driving control method.

Referring to FIG. 8, a computing system 1000 related to an autonomous driving control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the features disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively or additionally, the processor and storage medium may be implemented with separate components in the user terminal.

The above description is merely an example of the technical idea of the present disclosure and various modifications, and various modifications may be made by one skilled in the art without departing from the essential characteristic of the present disclosure.

Accordingly, the exemplary aspects of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

Descriptions of an example autonomous driving control apparatus and an example method thereof are as follows.

According to one or more aspects present disclosure, an autonomous driving control apparatus may identify an expected driving speed of a host vehicle by using real-time traffic information and host vehicle information including at least one of the weight of the host vehicle, the type of a gear, or any combination thereof, and may determine whether the host vehicle will experience a roll-back phenomenon, based on an expected driving speed, thereby adaptively performing stop control or providing a notification function depending on situations.

Moreover, when the roll-back of the host vehicle is expected in a hill section with a specific gradient, the autonomous driving control apparatus may provide a user with another driving route other than a current driving route.

Furthermore, according to one or more aspects of the present disclosure, the roll-back phenomenon may be prevented in advance by expecting roll-back in advance by using a sensor device immediately before the host vehicle enters the hill section and providing the user with the expected result and/or a request for a transition of control authority for the host vehicle.

Furthermore, according to one or more aspects of the present disclosure, when it is determined that a roll-back phenomenon occurs or is expected to occur, by using a driving environment or information of the host vehicle when the host vehicle reaches the hill section, or when the host vehicle is stopped and then attempts to restart based on identified various pieces of information, but fails to restart (e.g., when the roll-back n continues to occur), safety and convenience may be provided to transfer the control authority to the user after the host vehicle is stopped again, and to terminate autonomous driving control.

Besides, a variety of effects directly or indirectly understood through the present disclosure may be provided.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. An apparatus comprising:
  a sensor device;

a drive system comprising at least one of a motor, an engine, or a gear;

a memory configured to store instructions; and a processor operatively coupled to the sensor device, the drive system, and the memory, wherein the instructions, when executed by the processor, cause the apparatus to:

identify, by using the sensor device, host vehicle information, wherein the host vehicle information comprises at least one of: a real-time weight of a host vehicle, gear information of the host vehicle, or a driving speed of the host vehicle;

determine, based on inputting the host vehicle information and information on a hill into a map, required driving torque that is required to drive, by using the drive system, the host vehicle on the hill on a driving route of the host vehicle;

output, based on output available torque of the host vehicle being less than the required driving torque, at least one of: route change information or a transition request for transitioning a control authority for the host vehicle;

obtain, based on a determination that the host vehicle reaches the hill, driving information, wherein the driving information comprises the driving speed; and based on a gradient of the hill and based on the driving information satisfying a specified condition, stop the host vehicle and restart the host vehicle, wherein the specified condition comprises the driving speed being decreased and a separation distance between the host vehicle and another vehicle adjacent to the host vehicle being increasing.

2. The apparatus of claim 1, further comprising:

a communication device, wherein the instructions, when executed by the processor, cause the apparatus to:

receive, via the communication device, map information about the driving route, wherein the map information comprises at least one of: an advanced driver assistance system (ADAS) map, a precision map, a navigation map, or real-time traffic information; and identify, based on the map information, the required driving torque.

3. The apparatus of claim 2, wherein the instructions, when executed by the processor, cause the apparatus to:

identify, based on the map information and based on the host vehicle reaching a section on the driving route, section information of the section and an expected driving speed, wherein the section has a gradient greater than or equal to a specified value; and determine, based on the section information and the expected driving speed, the required driving torque.

4. The apparatus of claim 2, wherein the instructions, when executed by the processor, cause the apparatus to:

identify, based on the map information and based on the output available torque being less than the required driving torque, a different driving route for providing a guide to bypass the hill;

output the route change information, wherein the route change information indicates the different driving route; and control, based on a route change response being received from a user, the host vehicle to drive along the different driving route.

5. The apparatus of claim 1, wherein the instructions, when executed by the processor, cause the apparatus to:

before the host vehicle reaches the hill, identify, by using the sensor device, sensing information comprising at least one of: gradient information of the hill, road surface information of the hill, an expected driving speed of the host vehicle on the hill, an operating history of the drive system, or a performance value of the drive system; and determine, based on the sensing information, the required driving torque.

6. The apparatus of claim 1, wherein the instructions, when executed by the processor, cause the apparatus to:

output, based on the output available torque being less than the required driving torque, the transition request for transitioning the control authority for the host vehicle; and based on a control authority transition acceptance response received from a user of the host vehicle, deactivate an autonomous driving control of the host vehicle and transfer the control authority to the user.

7. The apparatus of claim 1, wherein the instructions, when executed by the processor, cause the apparatus to:

based on a failure of receiving a control authority transition acceptance response from a user of the host vehicle, stop the host vehicle before the host vehicle reaches the hill and output a notification regarding the hill.

8. The apparatus of claim 1, wherein the driving information further comprises at least one of: a driving speed change rate of the host vehicle, a required acceleration, the required driving torque, or a gradient of the hill.

9. The apparatus of claim 8, wherein the instructions, when executed by the processor, cause the apparatus to stop the host vehicle and restart the host vehicle by:

based on the driving information satisfying the specified condition:

setting a deceleration control amount of the host vehicle in proportion to an absolute value of the driving speed change rate and stopping the host vehicle by using the set deceleration control amount; and after stopping the host vehicle, setting a torque slope for restarting the host vehicle in proportion to a magnitude of the gradient of the hill, and restarting the host vehicle based on the set torque slope.

10. The apparatus of claim 8, wherein the specified condition further comprises at least one of:

the driving speed of the host vehicle being less than or equal to a threshold speed, the required acceleration being positive, or the required driving torque being greater than or equal to a specified value.

11. A method comprising:

identifying, by a processor and by using a sensor device, host vehicle information, wherein the host vehicle information comprises at least one of: a real-time weight of a host vehicle, gear information of the host vehicle, or a driving speed of the host vehicle;

determining, by the processor and based on inputting the host vehicle information and information on a hill into a map, required driving torque that is required to drive, by using a drive system, the host vehicle on the hill on a driving route of the host vehicle;

outputting, by the processor and based on output available torque of the host vehicle being less than the required driving torque, at least one of: route change information or a transition request for transitioning a control authority for the host vehicle;

obtaining, based on a determination that the host vehicle reaches the hill, driving information, wherein the driving information comprises the driving speed; and controlling the host vehicle, based on a gradient of the hill and based on the driving information satisfying a specified condition, to stop the host vehicle and to restart the host vehicle, wherein the specified condition comprises the driving speed being decreased and a separation distance between the host vehicle and another vehicle adjacent to the host vehicle being increasing.

12. The method of claim 11, wherein the determining of the required driving torque comprises:

receiving, by the processor via a communication device, map information about the driving route, wherein the map information comprises at least one of: an advanced driver assistance system (ADAS) map, a precision map, a navigation map, or real-time traffic information; and identifying, by the processor and based on the map information, the required driving torque.

13. The method of claim 12, wherein the determining of the required driving torque comprises:

identifying, based on the map information and based on the host vehicle reaching a section on the driving route, section information of the section and an expected driving speed, wherein the section has a gradient greater than or equal to a specified value; and determining, based on the section information and the expected driving speed, the required driving torque.

14. The method of claim 12, further comprising:

identifying, based on the map information and based on the output available torque being less than the required driving torque, a different driving route for providing a guide to bypass the hill; and outputting, by the processor, the route change information, wherein the route change information indicates the different driving route.

15. The method of claim 11, wherein the determining of the required driving torque comprises:

before the host vehicle reaches the hill, identifying, by using the sensor device, sensing information comprising at least one of: gradient information of the hill, road surface information of the hill, an expected driving speed of the host vehicle on the hill, an operating history of the drive system, or a performance value of the drive system; and determining, based on the sensing information, the required driving torque.

16. The method of claim 11, further comprising:

outputting, based on the output available torque being less than the required driving torque, the transition request for transitioning the control authority for the host vehicle; and based on a control authority transition acceptance response received from a user of the host vehicle, deactivating an autonomous driving control of the host vehicle and transferring the control authority to the user.

17. The method of claim 11, further comprising:

based on a failure of receiving a control authority transition acceptance response from a user of the host vehicle, stopping the host vehicle before the host vehicle reaches the hill and outputting a notification regarding the hill.

18. The method of claim 17, wherein:

the driving information further comprises at least one of: a driving speed change rate of the host vehicle, a required acceleration, the required driving torque, or a gradient of the hill.

19. The method of claim 18, further comprising:

setting, by the processor, a deceleration control amount of the host vehicle in proportion to an absolute value of the driving speed change rate and stopping the host vehicle by using the set deceleration control amount; and after stopping the host vehicle, setting, by the processor, a torque slope for restarting the host vehicle in proportion to a magnitude of the gradient of the hill, and restarting the host vehicle based on the set torque slope.

20. The method of claim 18, wherein the specified condition further comprises at least one of:

the driving speed of the host vehicle being less than or equal to a threshold speed, the required acceleration being positive, or the required driving torque being greater than or equal to a specified value.

* * * * *